(12) United States Patent
Gachik et al.

(10) Patent No.: US 7,406,955 B1
(45) Date of Patent: Aug. 5, 2008

(54) METHOD AND SYSTEM FOR LIQUID FUEL CONDITIONING

(75) Inventors: Igor A Gachik, Boca Raton, FL (US); Lev M Gurarye, Sunny Isles Beach, FL (US); Victor N Gurin, Hollywood, FL (US); Yuri S. Levin, Weston, FL (US); Naum Staroselsky, Sunny Isles Beach, FL (US); Sam Vaynblat, Coral Springs, FL (US)

(73) Assignee: Ultimate Combustion Company, Deerfield Beach, FL (US)

( * ) Notice: Subject to any disclaimer, the term of this patent is extended or adjusted under 35 U.S.C. 154(b) by 0 days.

(21) Appl. No.: 11/943,323

(22) Filed: Nov. 20, 2007

(51) Int. Cl.
*F02M 17/22* (2006.01)
*F02M 25/00* (2006.01)
(52) U.S. Cl. ................... 123/522; 123/1 A
(58) Field of Classification Search .......... 123/1 A, 123/27 GE, 522–525, 527
See application file for complete search history.

(56) References Cited

U.S. PATENT DOCUMENTS 6,189,516 B1 * 2/2001 Hei Ma ............... 123/524
6,273,072 B1 * 8/2001 Knapstein et al. ......... 123/527
7,281,500 B1 * 10/2007 Firey ..................... 123/23

* cited by examiner

*Primary Examiner*—Hai H Huynh
(74) *Attorney, Agent, or Firm*—Laurence A. Greenberg; Werner H. Stemer; Ralph E. Locher

(57) ABSTRACT

A fuel conditioning method is applicable to common rail direct injection or unit injector system. A liquid fuel is conditioned for higher-efficiency combustion in a combustion chamber. The conditioning system includes a fuel vessel for fuel conditioning, at least one fuel dispersing nozzle mounted for discharge into the fuel conditioning vessel, at least one gas inlet port, and at least one conditioned fuel outlet port located in the vessel. A gas source feeds a gas to the fuel conditioning vessel, wherein the gas is dissolved in the liquid fuel for forming a liquid/gas fuel solution. A low-pressure fuel pump and a liquid fuel supply line deliver liquid fuel from a fuel tank to the at least one dispersing nozzle of the fuel vessel at pressure $P_1$ higher than the gas pressure $P_2$. A high-pressure fuel pump feeds the liquid fuel/gas solution into a common rail and further into fuel injectors, providing a pressure $P_4$ higher than a pressure $P_5$ in the combustion chamber at a moment of combustion.

11 Claims, 2 Drawing Sheets

METHOD AND SYSTEM FOR LIQUID FUEL CONDITIONING

BACKGROUND OF THE INVENTION

Field of the Invention

The present invention relates to a field of liquid fuel combustion and, more particularly, to a common rail direct injection fuel systems or to a unit injector system, delivering to the high-pressure fuel pump (or pumps) a conditioned fuel in a form of under-saturated solution in said fuel of such gases as $CO_2$ or air or a mixture of gases with a purpose to achieve a high degree of a fuel dispersion in a combustion chamber of a reciprocating or gas turbine engine, or any other device having the combustion chamber.

It is common knowledge that the dispersion of a liquid fuel results in a highly developed active surface of this liquid fuel which allows to burn fuel more efficiently. The small size of the combustion chamber in a reciprocating engine, for example, results in the partial deposition of the injected fuel on the piston and combustion chamber walls creating a liquid film on them. This part of fuel can not be burnt completely and is getting lost with exhaust. Uneven distribution of the liquid fuel particles over a volume of the combustion chamber causes a delay in the flame propagation, lowering an efficiency of the combustion process—delivering less power. High dispersion of the fuel would allow avoiding these problems. Completely burned fuel delivers more power, the temperature of the combustion drops and the amount of environmentally polluting exhaust gases (e.g., $NO_x$ and $CO_2$) also diminishes with the decrease in the exhaust temperature.

There are different ways to provide dispersion of the liquid fuel, for instance with the help of electronically controlled fuel injectors fed by high-pressure fuel pump or electronically controlled direct injection units, each of them comprising electronically controlled fuel injector and dedicated high-pressure fuel pump. Latest efforts in the area of the fuel direct injection system design by the most prominent automotive engine builders have resulted in the development of very high pressure injection systems—up to 2400 bar. This level of pressure is providing for very fine dispersion of fuel, thus ensuring a significantly improved efficiency of the internal combustion engine. But even those systems are not free from above mentioned shortcomings. Besides, such a level of fuel compression demands for much more advanced manufacturing technology, more sophisticated design and highly trained internal combustion engine maintenance personal. All this means more expensive final products—cars, diesel generators, agricultural machinery etc.

There are known attempts to disperse fuel by dissolving some gas, for instance air or $CO_2$ or a mixture of gases in the liquid fuel at high pressure and subsequently injecting this solution into the combustion chamber. Dissolved gas is getting violently released from the solution if injected into the combustion chamber where pressure is lower than in the solution, providing for very fine and uniform dispersion of the liquid fuel.

Reference is had, in this context, to prior art patents, such as, for instance U.S. Pat. Nos. 4,596,210; 6,273,072; and U.S. Pat. No. 7,011,048 B2. Those patents describe devices and methods that provide for the implementation of the described effect.

For example, commonly assigned U.S. Pat. No. 7,011,048 B2 describes a fuel modification system which particularly comprises a device for facilitating gas dissolution in the liquid fuel with help of highly developed absorbing surfaces created by corrugated inserts placed in specially design for this purpose vessel. Since the prepared in that vessel solution turned out saturated, after that it is subjected to compression with the help of high-pressure pump for preventing a development of gas bubbles in the solution, when it is further on its way to the combustion chamber. For the same purpose this fuel conditioning system is equipped with cooling device—according to Henry's Law, the saturation point (maximum concentration of gas in a gas/liquid solution) is raised when the pressure increases and when the temperature decreases.

As mentioned above, the described embodiment requires a specially designed device which is supposed to work within a certain range of parameters (laminar flow rate of fuel and certain pressure of gas and fuel) to provide for proper dissolution of gas in liquid fuel, and, at the same time, the gas and liquid fuel are supposed to have certain parameters for proper work of the combustion chamber feeding system. It is difficult to satisfy both of these requirements simultaneously.

As experiments proved much less complicated system can be employed providing for satisfactory implementation of the aforementioned dispersion process. This is especially true in case of combining the dispersion of fuel/gas solution technology with the common rail direct injection technology or unit injector system technology since latter two are already equipped with high-pressure fuel pump (or pumps)—one of the most expensive components of the discussed fuel supply systems. It is very important to emphasize that combining this two technologies together allows to substantially decrease a level of necessary high-pressure in the system obtaining nevertheless more fine dispersion of the fuel or rather fuel/gas solution in a combustion chamber because the dispersion is achieved rather thanks to the gas violent escaping from the solution then to a mechanical breaking of the liquid on the particles as a result of abrupt in liquid pressure drop alone. It is also acceptable to get away with fuel cooling system because a high pressure provided by high-pressure fuel pump (or pumps) can easily compensate for saturation point temperature rise in the liquid fuel/gas solution and said pump can handle few bubbles developed on the way from fuel conditioning vessel to the pump.

BRIEF SUMMARY OF THE INVENTION

It is accordingly an objective of this invention to provide a method and apparatus which overcomes the above-mentioned disadvantages and which provides for further improvement in the liquid/gas fuel solution injection into a combustion chamber.

With the above and other objects in view there is provided, in accordance with the invention, an internal combustion engine with a common rail direct injection fuel supply system or with unit injector fuel supply system, comprising:

a fuel conditioning vessel, at least one fuel dispersing nozzle mounted for discharging fuel into said fuel conditioning vessel; at least one gas inlet port for feeding gas into said fuel conditioning vessel and a liquid/gas fuel solution level sensor to maintain a proper level of a liquid/gas fuel solution in said vessel;

a gas source and a gas line fluidically connecting an outlet port of gas source with an inlet port of an electronically controlled gas pressure regulator maintaining a gas pressure $P_2$;

said electronically controlled gas pressure regulator and a gas line fluidically connecting a gas outlet port of said electronically controlled gas pressure regulator to a gas inlet port of said fuel conditioning vessel for feeding gas into said fuel conditioning vessel, whereby the gas is dissolved in the liquid fuel for forming a liquid/gas fuel solution;

an electronically controlled low-pressure fuel pump and a liquid fuel supply line fluidically connecting an outlet port of said electronically controlled low-pressure fuel pump to said at least one dispersing nozzle of said fuel conditioning vessel at a pressure $P_1$ higher than said gas pressure $P_2$; and a direct injection unit fuel supply system for feeding conditioned fuel to electronically controlled fuel injectors at a high pressure $P_3$ exceeding a pressure $P_4$ present in the combustion chamber of internal combustion engine at the moment of injection and a liquid fuel supply line fluidically connecting an outlet port of said fuel conditioning vessel to inlet ports of said electronically controlled fuel injectors; or a high-pressure fuel pump for raising pressure to a high level $P_3$ exceeding a pressure $P_4$ present in the combustion chamber of internal combustion engine at the moment of injection and a liquid/gas fuel solution supply line fluidically connecting an outlet port of said fuel conditioning vessel to an inlet port of said high-pressure fuel pump;

a common rail and high-pressure liquid/gas fuel solution supply line fluidically connecting an outlet port of said high-pressure fuel pump to an inlet port of said common rail;

an electronically controlled fuel injectors for injecting said liquid/gas fuel solution at a high pressure $P_3$ exceeding a pressure $P_4$ present in the combustion chamber of internal combustion engine at the moment of injection into said combustion chamber and high-pressure liquid/gas fuel solution supply lines fluidically connecting multiple outlet ports of said common rail to inlet ports of said electronically controlled fuel injectors; and an electronic control system for providing a timely start and duration optimization of operations of all electronically controlled devices for maximum fuel efficiency.

In accordance with an additional feature of the invention, the fuel pressure $P_1$ is set higher than the gas pressure $P_2$ to ensure a fuel pressure drop sufficient for satisfactory dispersion of the liquid/gas fuel solution by said nozzle.

With the above and other objects in view, there is also provided, in accordance with the invention, a method of conditioning fuel and supplying conditioned fuel to a combustion process, the method which comprises:

providing a vessel for fuel conditioning, the vessel having a housing, at least one fuel dispersing nozzle, a gas inlet port, a conditioned fuel outlet port, at least one level sensor for registering a level of conditioned fuel in the vessel;

feeding liquid fuel into the vessel at a relatively high pressure $P_1$ higher than a proper gas pressure $P_2$ and thereby setting a pressure drop at the nozzle sufficient to satisfactorily disperse the fuel, and setting a volume of fuel flow through the nozzle sufficient for filling up the vessel at the rate not lower than a rate of the fuel consumption by a combustion chamber;

feeding at least one gas into the vessel through the gas inlet at the gas pressure $P_2$ during the processes of fuel conditioning in the vessel and feeding conditioned fuel into a high-pressure fuel pump and further into the combustion chamber; and conditioning more fuel and filling the vessel with fuel upon receiving from the sensor a signal registering low level of conditioned fuel in the vessel, and automatically switching the filling off upon receiving from the sensor a signal registering high level of conditioned fuel in the vessel.

In accordance with an added feature of the invention, the fuel pressure $P_1$ is set higher than the gas pressure $P_2$ to provide for a fuel pressure drop sufficient for satisfactory dispersion of the liquid fuel by the nozzle.

In accordance with an additional feature of the invention, a gas concentration level in the solution exceeds the solution saturation level for conditions present in the combustion chamber at the moment of injection.

With the above and other objects in view there is also provided, in accordance with the invention, in an internal combustion engine fuel delivery system, including a fuel injection system for injecting into a combustion chamber of the internal combustion engine, a fuel conditioning system, comprising:

a vessel for fuel conditioning, said vessel having a housing and at least one fuel dispersing nozzle mounted therein and gas inlet port;

a fuel outlet port and sensor for a conditioned fuel upper and lower levels control in said vessel;

a low-pressure pump for providing liquid fuel flow at a low pressure to at least one dispersing nozzle mounted in said fuel conditioning vessel, the pressure being set to a level higher than a level of the gas pressure in said vessel to provide for a fuel pressure drop sufficient for satisfactory dispersion of fuel by said nozzle; and a unit injector fuel supply system for feeding conditioned fuel to electronically controlled fuel injectors at a high pressure $P_3$ exceeding a pressure $P_4$ present in the combustion chamber of the internal combustion engine at the moment of injection and a liquid fuel supply line fluidically connecting an outlet port of said fuel conditioning vessel to inlet ports of said unit injectors fuel supply line; or a high-pressure pump for feeding a liquid/gas fuel solution into a combustion chamber at a pressure higher than a pressure level in said combustion chamber at the moment of combustion;

a piping circuit fluidically interconnecting various components of the system; and an electronic control system for providing a timely start and duration optimization of operations of all electronically controlled devices for maximum fuel efficiency.

An internal combustion engine with a common rail direct injection fuel supply system having a fuel supply tank, a low-pressure fuel pump, a fuel conditioning vessel and a high-pressure fuel pump or a direct injection unit fuel supply system having a fuel supply tank, a low-pressure fuel pump and a fuel conditioning vessel is provided together with compressor (for air) or gas supply tank (for air, oxygen, $CO_2$, gas mixtures) and piping system, fluidly connecting all of the above. The fuel conditioning vessel is equipped with at list one nozzle dispersing pressurized fuel delivered from the fuel tank by low pressure fuel pump to the fuel conditioning vessels and is equipped with conditioned fuel level control sensor. The fuel conditioning vessel is also equipped with a gas inlet port located at an upper part of the fuel conditioning vessel and with a conditioned fuel outlet port located at the bottom of the fuel conditioning vessels. The gas supply source—a gas tank (e.g., for air or $CO_2$ or a mixture of gases) or a compressor (for air) is equipped with a pressure regulator for ability to control a pressure of gas supplied to the fuel conditioning vessel. An electronic control system is provided for a timely start and duration optimization of operations of all electronically controlled devices for maximum fuel efficiency.

To summarize once more: The novel fuel conditioning method is applicable to common rail direct injection or unit injector system. A liquid fuel is conditioned for higher-efficiency combustion in a combustion chamber. The conditioning system includes a fuel vessel for fuel conditioning, at least one fuel dispersing nozzle mounted for discharge into the fuel conditioning vessel, at least one gas inlet port and at least one conditioned fuel outlet port located in the vessel. A level sensor registers a level of conditioned fuel in the fuel conditioning vessel. A gas source feeds a gas to the fuel conditioning vessel, wherein the gas is dissolved in the liquid fuel for forming a liquid/gas fuel solution. A low-pressure fuel pump and a liquid fuel supply line deliver liquid fuel from a fuel tank to the at least one dispersing nozzle of the fuel vessel at pressure $P_1$ higher than the gas pressure $P_2$. A high-pressure fuel pump feeds the liquid fuel/gas solution into a common rail and further into electronically controlled fuel injectors located in a combustion chamber, providing a pressure $P_4$ that is higher than a pressure $P_5$ in the combustion chamber at a moment of combustion. A control unit is connected to all electronically controlled devices of the fuel system for assuring a timely start and duration optimization of operations for all those devices to provide maximum fuel efficiency. The fuel conditioning system can also be employed for feeding prepared liquid fuel/gas solution into a direct injection unit fuel supply system, where the solution would be fed into individual high-pressure pumps each of them providing highly compressed conditioned fuel to the electronically controlled fuel injectors.

Other features which are considered as characteristic for the invention are set forth in the appended claims.

Although the invention is illustrated and described herein as embodied in method and system for liquid fuel conditioning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
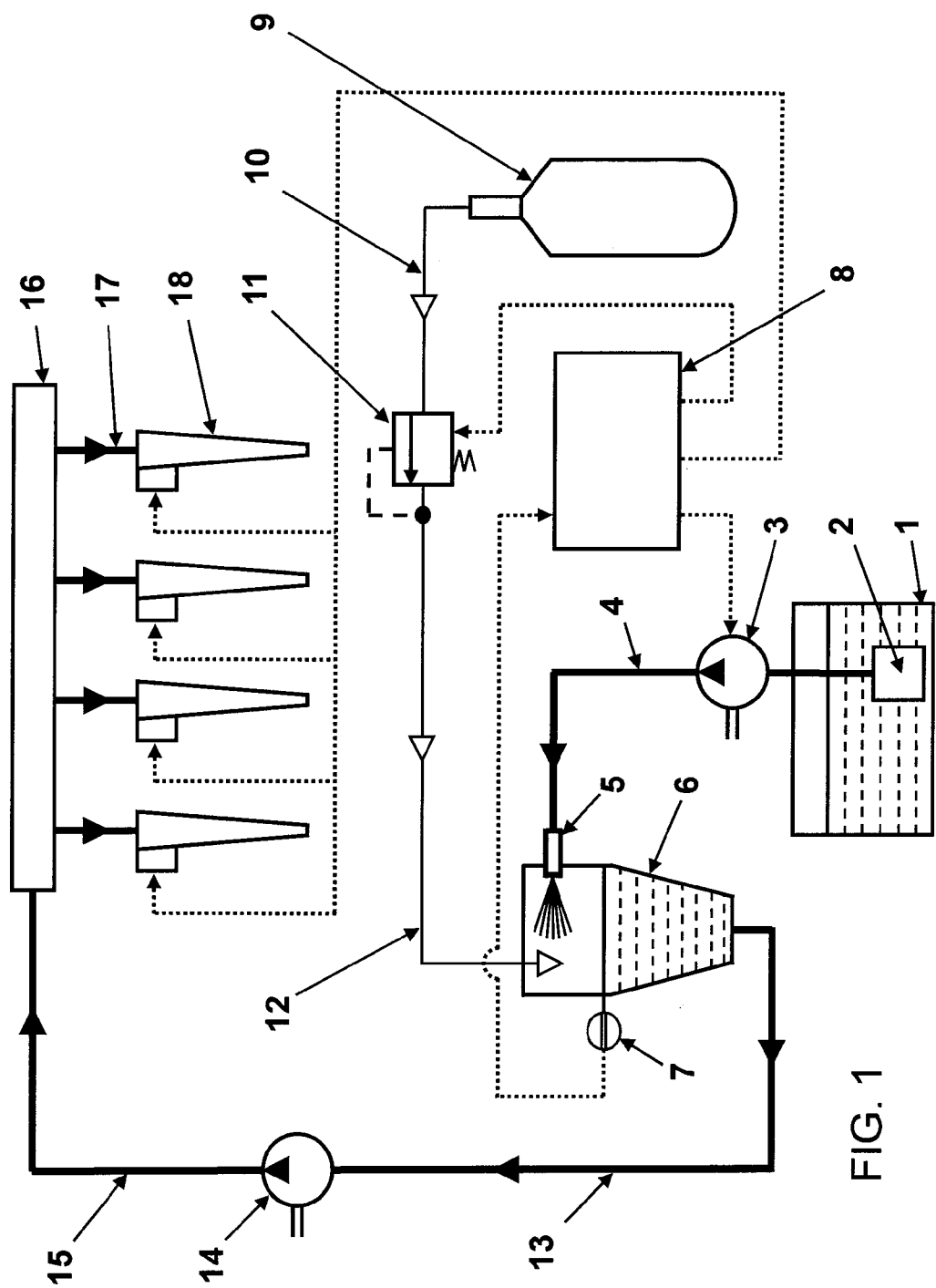
FIG. 1 is a diagrammatic view of the fuel conditioning system for the internal combustion engine with common rail direct injection fuel supply system.

Referring now to the FIG. 1 of the drawing in detail, the system consists of the fuel tank 1, a fuel filter 2, the low-pressure fuel pump 3 for delivering liquid fuel from the fuel tank 1 by the fuel line 4 to at list one dispersing nozzle 5 mounted in the fuel conditioning vessel 6. The low-pressure fuel pump 3 provides fuel pressure $P_1$. The level of fuel in the fuel conditioning vessel 6 is controlled by the sensor 7. The source of compressed gas 9 (for instance air, $CO_2$, oxygen, a mixture of gases, etc.) is fluidically connected by the line 10 to the inlet port of pressure reducer 11 which is controlling pressure of gas at the level $P_2$ downstream of the pressure reducer 11 in the line 12.

Gas pressure $P_2$ is set up lower than the fuel pressure $P_1$ created by low-pressure fuel pump 3 at the level providing satisfactory working condition for the nozzle 5. The dispersion of fuel in gas results in achieving significant amount of gas being dissolved in fuel.

The line 12 is further fluidically connecting an outlet port of pressure reducer 11 with a gas inlet port located in the upper part of the fuel conditioning vessel 6. An outlet port located at the bottom of the fuel conditioning vessel 6 is fluidically connected by a line 13 to the inlet port of a high-pressure fuel pump 14. An outlet port of the high-pressure fuel pump 14 is fluidically connected by a line 15 to an inlet port of a common rail 16, which is fluidically connected by lines 17 to the electronically controlled fuel injectors 18 of the internal combustion engine (not shown). There is a fuel level control system comprising a level control switch 7 mounted in the conditioning vessel 6 to provide for near permanent level of liquid/gas fuel solution in the fuel conditioning vessel 6 and thus for the permanent conditions of the liquid/gas fuel solution preparation.

The liquid fuel is pumped by the low-pressure fuel pump 3 into the conditioning vessel 6. The fuel is being dispersed in the upper part of the conditioning vessel 6 where compressed gas (for instance air or $CO_2$) is delivered from the compressed gas tank 9 (in case of using $CO_2$) or air compressor (not shown) by the lines 10 and 12. The pressure of gas $P_2$ is set up lower than the pressure $P_1$ provided by the low-pressure fuel pump 3 to guaranty satisfactory working conditions for the nozzle 5. Dispersing the liquid fuel into the occupied by gas upper part of the conditioning vessel 6 results in a dissolving certain amount of gas in the liquid fuel. The amount of gas dissolved in the liquid fuel depends particularly on the pressure $P_2$ in the conditioning vessel 6. The level control switch 7 is mounted in the conditioning vessel 6 to ensure insignificant volume variations of the liquid and gas filled spaces of the fuel conditioning vessel 6 to provide for near permanent conditions of the liquid/gas fuel solution preparation. Prepared liquid/gas fuel solution is delivered to the high-pressure fuel pump 14 by the line 13, where it is being compressed to the pressure $P_3$ exceeding a pressure in the combustion chamber $P_4$ of an internal combustion engine (not shown) and is further delivered by high-pressure fuel line 15 to the common rail 16. Electronically controlled injectors 18 fluidically connected with common rail 16 by individual high-pressure lines 17 inject precise portions of the liquid/gas fuel solution at precise time in the combustion chamber of the internal combustion engine. Since the pressure in the injected liquid/gas fuel solution is higher than the pressure in the combustion chamber of the internal combustion engine, dissolved in the liquid/gas fuel solution gas violently escapes from the liquid, breaking it to very small liquid fuel particles, providing for particles even distribution over the volume of the combustion chamber and for the speedy propagation of the burning front. Because of the very small size of the liquid fuel particles, they are burning before said particles can reach combustion chamber walls and the bottom of the piston of the internal combustion engine where otherwise said particles could have created cold film on the surfaces. Faster and more efficiently burnt fuel delivers more energy, so it takes less fuel to produce the same amount of power.

Figure 2:
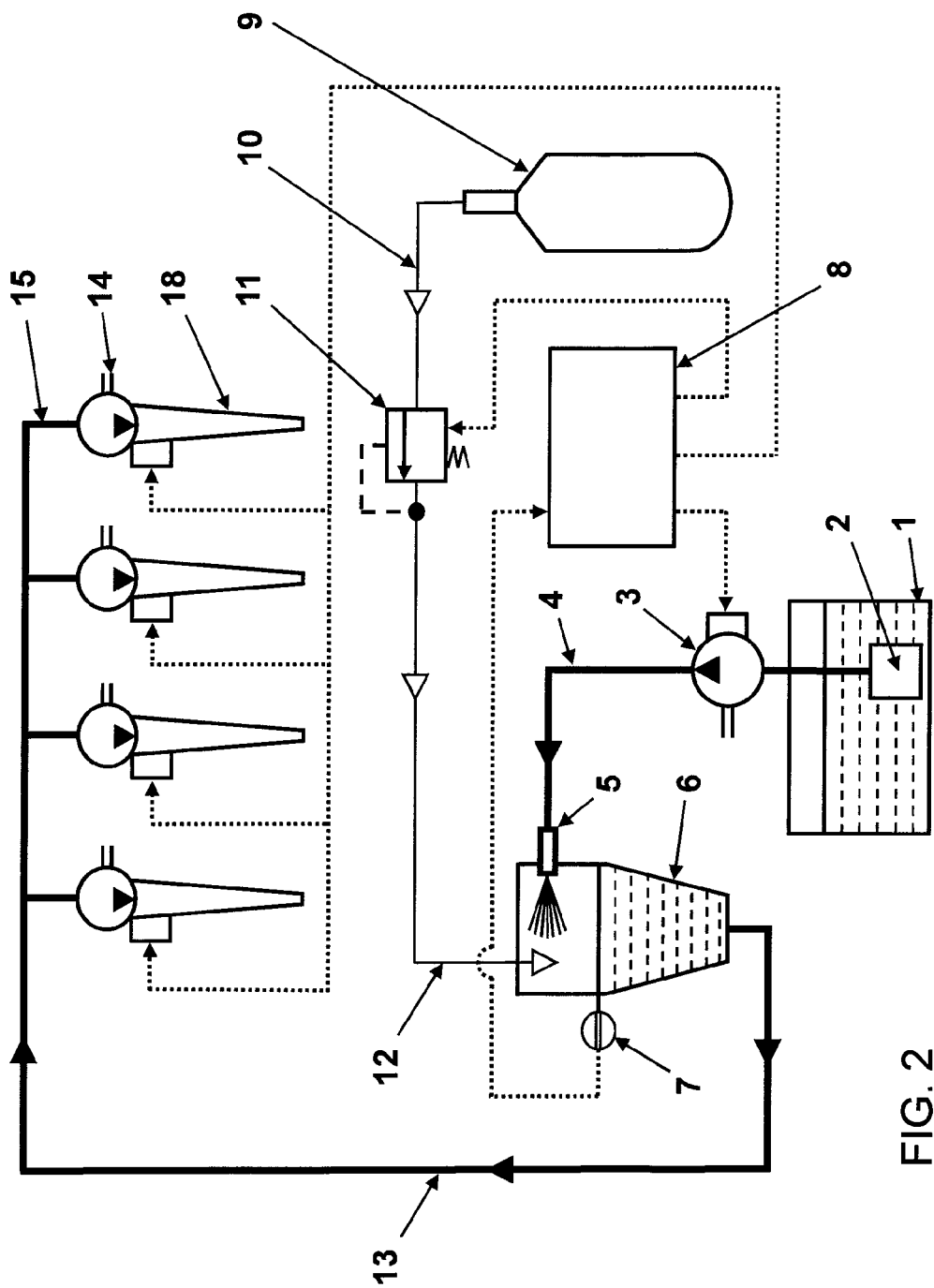
FIG. 2 is a diagrammatic view of the fuel conditioning system for the internal combustion engine with a unit injector fuel supply system.

In another embodiment, referring now to the FIG. 2 of the drawing in detail, the system consists of the fuel tank 1, a fuel filter 2, the low-pressure fuel pump 3 for delivering liquid fuel from the fuel tank 1 by the fuel line 4 to at list one dispersing nozzle 5 mounted in the fuel conditioning vessel 6. The low-pressure fuel pump 3 provides fuel pressure $P_1$. The level of fuel in the fuel conditioning vessel 6 is controlled by the sensor 7. The source of compressed gas 9 (for instance air or $CO_2$ or a mixture of gases) is fluidically connected by the line 10 to the inlet port of pressure reducer 11 which is controlling pressure of gas at the level $P_2$ downstream of the pressure reducer 11 in the line 12.

Gas pressure $P_2$ is set up lower than the fuel pressure $P_1$ created by low-pressure fuel pump 3 at the level providing satisfactory working condition for the nozzle 5. The dispersion of fuel in gas results in significant amount of gas being dissolved in fuel.

The line 12 is further fluidically connecting an outlet of pressure reducer 11 to a gas inlet port located in the upper part of the fuel conditioning vessel 6. An outlet port located at the bottom of the fuel conditioning vessel 6 is fluidically connected by a line 13 and individual lines 15 to the inlet ports of the unit injectors of fuel supply system for feeding conditioned fuel to the electronically controlled fuel injectors at a high pressure $P_3$ exceeding a pressure $P_4$ present in the combustion chamber of internal combustion engine at the moment of injection and a liquid/gas fuel solution supply line fluidically connecting an outlet port of said fuel conditioning vessel to inlet ports of said unit injectors of fuel supply system.

There is a fuel level control system comprising a level control switch 7 mounted in the conditioning vessel 6 to provide for near permanent level of liquid/gas fuel solution in the fuel conditioning vessel 6 and thus for the permanent conditions of the liquid/gas fuel solution preparation.

The liquid fuel is pumped by the low-pressure fuel pump 3 into the conditioning vessel 6. The fuel is being dispersed in the upper part of the conditioning vessel 6 where compressed gas (for instance air or $CO_2$ or a mixture of gases) is delivered from the compressed gas tank 9 (in case of using $CO_2$) or air compressor (not shown) by the lines 10 and 12. The pressure of gas $P_2$ is set up lower than the pressure $P_1$ provided by the low-pressure fuel pump 3 to guaranty satisfactory working conditions for the nozzle 5. Dispersing the liquid fuel into the occupied by gas upper part of the conditioning vessel 6 results in a dissolving certain amount of gas in the liquid fuel. The amount of gas dissolved in the liquid fuel depends particularly on the pressure $P_2$ in the conditioning vessel 6. The level control switch 7 is mounted in the conditioning vessel 6 to ensure insignificant volume variations of the liquid and gas filled spaces of the conditioning vessel 6 to provide for near permanent conditions of the liquid/gas fuel solution preparation. Prepared liquid/gas fuel solution is delivered to the unit injector, comprising individual high-pressure fuel pumps 14 and electronically controlled fuel injectors 18 of the fuel supply system for feeding conditioned fuel into the combustion chamber of internal combustion engine at a high pressure $P_3$ exceeding a pressure $P_4$ present in the combustion chamber of internal combustion engine at the moment of injection. Said electronically controlled injectors 18 inject precise portions of the liquid fuel/gas solution at precise time in the combustion chamber of the internal combustion engine.

Since the pressure in the injected liquid/gas fuel solution is higher than the pressure in the combustion chamber of the internal combustion engine, dissolved in the liquid solution gas violently escapes from the liquid, breaking it to very small liquid fuel particles, providing for particles even distribution over the volume of the combustion chamber and for the speedy propagation of the burning front. Because of the very small size of the liquid fuel particles, they are burning before said particles can reach combustion chamber walls and the bottom of the piston of the internal combustion engine where otherwise said particles could have created cold film on the surfaces. Faster and more efficiently burnt fuel delivers more energy, so it takes less fuel to produce the same amount of power.

The invention claimed is:

1. A fuel conditioning and combustion chamber feeding system for an internal combustion engine, comprising:
    a fuel conditioning vessel, at least one fuel dispersing nozzle mounted for discharging fuel into said fuel conditioning vessel, and at least one gas inlet port for feeding gas into said fuel conditioning vessel;
    an electronically controlled gas pressure regulator configured to maintain a gas pressure $P_2$, a gas source, a gas line fluidically connecting an outlet port of said gas source with an inlet port of said gas pressure regulator, and a gas line fluidically connecting said gas pressure regulator with said at least one gas inlet port in said fuel conditioning vessel;
    an electronically controlled low-pressure fuel pump fluidically connected between a fuel source and said at least one fuel dispersing nozzle, said low-pressure fuel pump maintaining a fuel pressure $P_1$ higher than said gas pressure $P_2$; and
    wherein the gas fed into said fuel conditioning vessel is dissolved in the liquid fuel pumped into said fuel conditioning vessel for forming a liquid/gas fuel solution;
    a high-pressure fuel pump for raising pressure to a high level $P_3$ exceeding a pressure $P_4$ present in the combustion chamber of internal combustion engine at the moment of injection and a liquid/gas fuel solution supply line fluidically connecting an outlet port of said fuel conditioning vessel to an inlet port of said high-pressure fuel pump;
    a fuel supply system for feeding conditioned fuel in the form of the liquid/gas fuel solution from said high pressure fuel pump to electronically controlled fuel injectors for injection at a pressure $P_3$ exceeding a pressure $P_4$ present in a combustion chamber of the internal combustion engine at a moment of injection; and
    an electronic control system connected to said gas pressure regulator, to said low-pressure fuel pump, and to said electronically-controlled fuel injectors for providing timing and duration optimization for operating the electronically controlled devices for maximum fuel efficiency.

2. The system according to claim 1, which further comprises a liquid/gas fuel solution level sensor disposed to monitor a fill level in said fuel conditioning vessel.

3. The system according to claim 1, which comprises a liquid fuel supply line fluidically connecting an outlet port of said fuel conditioning vessel to inlet ports of said unit injector fuel supply system, and a liquid/gas fuel solution supply line fluidically connecting an outlet port of said fuel conditioning vessel to an inlet port of said high-pressure fuel pump.

4. The system according to claim 1, wherein said fuel supply system comprises a unit injector fuel supply system for feeding conditioned fuel from said fuel conditioning vessel to electronically controlled fuel injectors at a pressure $P_3$ exceeding a pressure $P_4$ present in a combustion chamber of the internal combustion engine at a moment of injection.

5. The system according to claim 1, wherein said fuel supply system comprises a common rail fuel injection system, and a high-pressure fuel pump for raising a pressure of the liquid/gas fuel solution to a pressure $P_3$ exceeding a pressure $P_4$ present in a combustion chamber of the internal combustion engine at the moment of injection and for supplying the liquid/gas fuel solution to said common rail fuel injection system, a plurality of electronically controlled fuel injectors for injecting the liquid/gas fuel solution at the pressure $P_3$ into the combustion chamber, and a plurality of high-pressure liquid/gas fuel solution supply lines fluidically connecting multiple outlet ports of said common rail to inlet ports of said electronically controlled fuel injectors.

6. The system according to claim 1, wherein the fuel pressure $P_1$ is set higher than the gas pressure $P_2$ to ensure a fuel pressure drop sufficient for satisfactory dispersion by said nozzle.

7. The system according to claim 1, wherein the liquid/gas fuel solution pressure $P_3$ provided by said high-pressure fuel pump is set higher than the pressure $P_4$ present in the combustion chamber of the internal combustion engine at the moment of said liquid/gas fuel solution injection into said combustion chamber.

8. A method of conditioning fuel and supplying conditioned fuel to a combustion process, the method which comprises:

(a) providing a vessel for fuel conditioning, the vessel having a housing, at least one fuel dispersing nozzle, a gas inlet port, a conditioned fuel outlet port, at least one level sensor for registering a level of conditioned fuel in the vessel;

(b) feeding liquid fuel into the vessel at a relatively high pressure $P_1$ higher than a gas pressure $P_2$ and thereby setting a pressure drop at the nozzle sufficient to satisfactorily disperse the fuel, and setting a volume of fuel flow through the nozzle sufficient for filling up the vessel at the rate not lower than a rate of the fuel consumption by a combustion chamber;

(c) feeding at least one gas into the vessel through the gas inlet at the gas pressure $P_2$ during the processes of fuel conditioning in the vessel and feeding conditioned fuel into a high-pressure fuel pump and further into the combustion chamber; and (d) conditioning more fuel and filling the vessel with fuel upon receiving from the sensor a signal registering low level of conditioned fuel in the vessel, and automatically switching the filling off upon receiving from the sensor a signal registering high level of conditioned fuel in the vessel.

9. The method according to claim 8, which comprises setting the fuel pressure $P_1$ higher than the gas pressure $P_2$ to provide for a fuel pressure drop sufficient for satisfactory dispersion of the liquid fuel by the nozzle.

10. The method according to claim 8, wherein a level of the gas concentration in the solution is set to exceeds a solution saturation level for conditions present in the combustion chamber at a moment of injection.

11. In an internal combustion engine fuel delivery system, including a fuel injection system for injecting into a combustion chamber of the internal combustion engine, a fuel conditioning system, comprising:

a vessel for fuel conditioning, said vessel having a housing and at least one fuel dispersing nozzle mounted therein and gas inlet port;

a fuel outlet port and sensor for a conditioned fuel upper and lower levels control in said vessel;

a low-pressure pump for providing liquid fuel flow at a low pressure to at least one dispersing nozzle mounted in said fuel conditioning vessel, the pressure being set to a level higher than a level of the gas pressure in said vessel to provide for a fuel pressure drop sufficient for satisfactory dispersion of fuel by said nozzle;

a cylinder injection system including:
a unit injector fuel supply system for feeding conditioned fuel to electronically controlled fuel injectors at a high pressure $P_3$ exceeding a pressure $P_4$ present in the combustion chamber of the internal combustion engine at the moment of injection and a liquid fuel supply line fluidically connecting an outlet port of said fuel conditioning vessel to inlet ports of said unit injectors fuel supply line; or
a high-pressure fuel pump for feeding a liquid/gas fuel solution into a combustion chamber by means of a plurality of electronically controlled fuel injectors at a pressure higher than a pressure level in said combustion chamber at the moment of combustion;

an electronic control system for providing timed start and duration optimization of operations of all electronically controlled devices for maximum fuel efficiency.

\* \* \* \* \*

(12) EX PARTE REEXAMINATION CERTIFICATE (10620th)
United States Patent
Gachik et al.

(10) Number: US 7,406,955 C1
(45) Certificate Issued: *Jun. 8, 2015

(54) METHOD AND SYSTEM FOR LIQUID FUEL CONDITIONING

(75) Inventors: Igor A Gachik, Boca Raton, FL (US); Lev M Gurarye, Sunny Isles Beach, FL (US); Victor N Gurin, Hollywood, FL (US); Yuri S. Levin, Weston, FL (US); Naum Staroselsky, Sunny Isles Beach, FL (US); Sam Vaynblat, Coral Springs, FL (US)

(73) Assignee: ULTIMATE COMBUSTION COMPANY, Deerfield Beach, FL (US)

Reexamination Request:
No. 90/013,188, Mar. 21, 2014

Reexamination Certificate for:
Patent No.: 7,406,955
Issued: Aug. 5, 2008
Appl. No.: 11/943,323
Filed: Nov. 20, 2007

(*) Notice: This patent is subject to a terminal disclaimer.

(51) Int. Cl.
*F02M 17/22* (2006.01)
*F02M 25/10* (2006.01)
*F02M 31/18* (2006.01)
*F02M 25/00* (2006.01)
*F02M 29/04* (2006.01)
*F02D 19/12* (2006.01)
*F02M 37/00* (2006.01)

(52) U.S. Cl.
CPC .............. *F02M 17/22* (2013.01); *F02M 25/10* (2013.01); *Y02T 10/126* (2013.01); *F02M 31/186* (2013.01); *F02M 25/00* (2013.01); *F02M 29/04* (2013.01); *Y02T 10/121* (2013.01); *F02D 19/12* (2013.01); *F02M 37/0064* (2013.01)

(58) Field of Classification Search
None
See application file for complete search history.

(56) References Cited

To view the complete listing of prior art documents cited during the proceeding for Reexamination Control Number 90/013,188, please refer to the USPTO's public Patent Application Information Retrieval (PAIR) system under the Display References tab.

*Primary Examiner* — Aaron J Lewis

(57) ABSTRACT

A fuel conditioning method is applicable to common rail direct injection or unit injector system. A liquid fuel is conditioned for higher-efficiency combustion in a combustion chamber. The conditioning system includes a fuel vessel for fuel conditioning, at least one fuel dispersing nozzle mounted for discharge into the fuel conditioning vessel, at least one gas inlet port, and at least one conditioned fuel outlet port located in the vessel. A gas source feeds a gas to the fuel conditioning vessel, wherein the gas is dissolved in the liquid fuel for forming a liquid/gas fuel solution. A low-pressure fuel pump and a liquid fuel supply line deliver liquid fuel from a fuel tank to the at least one dispersing nozzle of the fuel vessel at pressure $P_1$ higher than the gas pressure $P_2$. A high-pressure fuel pump feeds the liquid fuel/gas solution into a common rail and further into fuel injectors, providing a pressure $P_4$ higher than a pressure $P_5$ in the combustion chamber at a moment of combustion.

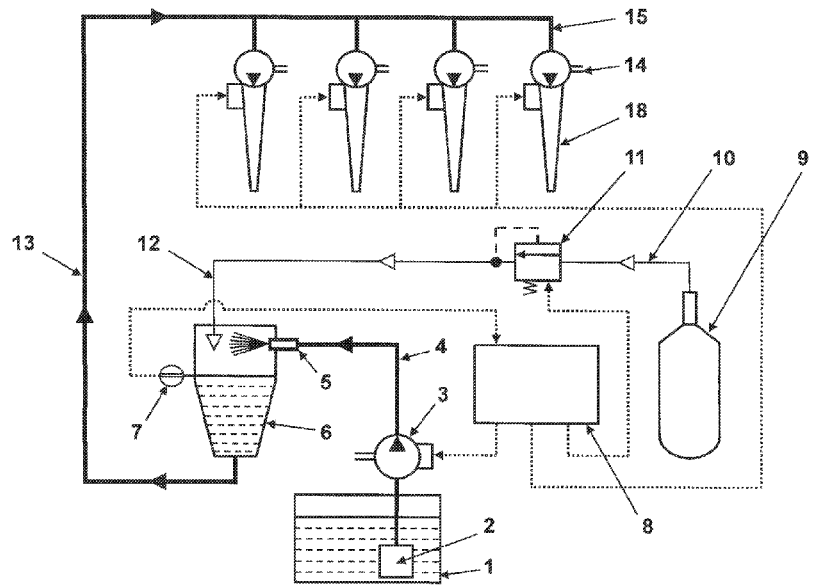

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-11 is confirmed.

\* \* \* \* \*